US008578345B1

(12) United States Patent
Kennedy et al.

(10) Patent No.: US 8,578,345 B1
(45) Date of Patent: Nov. 5, 2013

(54) MALWARE DETECTION EFFICACY BY IDENTIFYING INSTALLATION AND UNINSTALLATION SCENARIOS

(75) Inventors: Mark Kennedy, Redondo Beach, CA (US); Sourabh Satish, Fremont, CA (US); Alexander Danileiko, Newport Coast, CA (US); Ming-Jen Wang, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 801 days.

(21) Appl. No.: 12/761,364

(22) Filed: Apr. 15, 2010

(51) Int. Cl.
G06F 9/44 (2006.01)
G06F 9/445 (2006.01)
G06F 11/00 (2006.01)

(52) U.S. Cl.
USPC ............. 717/132; 717/127; 717/174; 726/25

(58) Field of Classification Search
None
See application file for complete search history.

(56) References Cited

U.S. PATENT DOCUMENTS

| | | | | |
|---|---|---|---|---|
| 5,303,375 A * | 4/1994 | Collins et al. | ................ | 718/100 |
| 7,162,741 B2 * | 1/2007 | Eskin et al. | ................ | 726/25 |
| 7,752,668 B2 * | 7/2010 | Omote et al. | ................ | 726/24 |
| 7,860,838 B2 * | 12/2010 | Gupta et al. | ................ | 707/651 |
| 7,934,261 B1 * | 4/2011 | Saguiguit et al. | ................ | 726/24 |
| 7,945,956 B2 * | 5/2011 | Mody et al. | ................ | 726/24 |
| 8,065,728 B2 * | 11/2011 | Wang et al. | ................ | 726/22 |
| 8,079,085 B1 * | 12/2011 | Wu et al. | ................ | 726/24 |
| 8,091,127 B2 * | 1/2012 | Bradicich et al. | ................ | 726/22 |
| 8,225,406 B1 * | 7/2012 | Nachenberg | ................ | 726/24 |
| 8,234,709 B2 * | 7/2012 | Viljoen et al. | ................ | 726/24 |
| 8,458,695 B2 * | 6/2013 | Fitzgerald et al. | ................ | 718/1 |
| 8,479,174 B2 * | 7/2013 | Chiriac | ................ | 717/136 |
| 2003/0149934 A1 * | 8/2003 | Worden | ................ | 715/513 |
| 2004/0107414 A1 * | 6/2004 | Bronicki et al. | ................ | 717/105 |
| 2004/0168157 A1 * | 8/2004 | Hundt et al. | ................ | 717/130 |
| 2005/0257090 A1 * | 11/2005 | Santos et al. | ................ | 714/35 |
| 2006/0085857 A1 * | 4/2006 | Omote et al. | ................ | 726/24 |
| 2007/0067842 A1 * | 3/2007 | Greene et al. | ................ | 726/24 |
| 2008/0066179 A1 * | 3/2008 | Liu | ................ | 726/24 |
| 2008/0115219 A1 * | 5/2008 | Kim et al. | ................ | 726/25 |
| 2009/0070878 A1 * | 3/2009 | Wang et al. | ................ | 726/24 |
| 2010/0154060 A1 * | 6/2010 | Demblewski | ................ | 726/24 |
| 2011/0010697 A1 * | 1/2011 | Golovkin | ................ | 717/155 |
| 2011/0016528 A1 * | 1/2011 | Zhou et al. | ................ | 726/23 |
| 2011/0179484 A1 * | 7/2011 | Tuvell et al. | ................ | 726/22 |
| 2011/0239195 A1 * | 9/2011 | Lin et al. | ................ | 717/126 |

OTHER PUBLICATIONS

Kris Kendall, Practical Malware Analysis, published by Mandiant Intelligent Information Security, 2007, pp. 1-10.*

(Continued)

Primary Examiner — Tuan Q. Dam
Assistant Examiner — Zheng Wei
(74) Attorney, Agent, or Firm — Brill Law Office; Jeffrey Brill

(57) ABSTRACT

The launch of an installer or uninstaller is detected. A process lineage tree is created representing the detected launched installer/uninstaller process, and all processes launched directly and indirectly thereby. The detected installer/uninstaller process is represented by the root node in the process lineage tree. Launches of child processes by the installer/uninstaller process and by any subsequently launched child processes are detected. The launched child processes are represented by child nodes in the tree. As long as the installer/uninstaller process represented by the root node in the tree is running, the processes represented by nodes in tree are exempted from anti-malware analysis. The termination of the installer/uninstaller process is detected, after which the processes represented by nodes in the process lineage tree are no longer exempted from anti-malware analysis.

20 Claims, 5 Drawing Sheets

(56) References Cited

OTHER PUBLICATIONS

Chad Schultz, How to use Sysinternals Process Monitor and Process Explorer to Troubleshoot SharePoint, published on Dec. 30, 2009, pp. 1-13.*

Adachi et al., Malware Analysis System using Process-level Virtualization, published by IEEE, 2009, pp. 550-556.*

Mehdi et al., IMAD: In-Execution Malware Analysis and Detection, published by ACM, 2009, pp. 1553-1560.*

* cited by examiner

MALWARE DETECTION EFFICACY BY IDENTIFYING INSTALLATION AND UNINSTALLATION SCENARIOS

TECHNICAL FIELD

This disclosure pertains generally to computer security, and more specifically to identifying installation and uninstallation scenarios, and distinguishing them from malware.

BACKGROUND

Installing and uninstalling programs on a computer results in system wide changes. For example, new and temporary executable files are created, processes are launched, persistent system setting changes are made, etc. This is the case because the process of installing new software (or uninstalling old software) on a computer involves making system level changes, both to add the new program to the computer and to modify the environment in order to use the new program. However, the types of system changes made during the install/uninstall process are similar in nature to actions taken by malware (e.g., a virus, worm or Trojan horse) as it infects a computer. Malware also creates new and temporary executable files, launches processes, modifies system settings, etc.

In the case of the installation of legitimate software, it is desirable for the installation process to make the system level changes and install the software program for the user. However, because malware makes similar looking system changes, an installation (or uninstallation) process can easily be mistaken for malware by an anti-malware detection system (e.g., an antivirus program).

It is not desirable for an anti-malware system to classify an installation/uninstallation process as comprising malware. First of all, typically the installation/uninstallation process runs with the user's knowledge and/or permission, to install or uninstall software at the direction of the user. Even if an installation program is installing malware, it is the actual malware being installed that is malicious, not the install package itself. In other words, if an installer is used to install a virus, it is the installed executable image(s) comprising the virus that should be classified as malware, not the installer itself. The installer is merely performing its designated task of installing software, and is agnostic as to the content of the software it installs.

It would be desirable to address these issues.

SUMMARY

An installation detection management system identifies installation and uninstallation scenarios, and exempts processes associated therewith from anti-malware analysis. The launch of installers and/or uninstallers is detected. The launch of an installer can be detected in a number of different ways. Some installers are in the form of executable files. In that case, executable files on the user's computer can be scanned for signatures associated with installers. Where such a signature is detected in a specific executable file, the launch of the specific executable file is classified as the launch of an installer. In other instances, installers are in the form of packed data files, which are opened by associated installation handler applications. In such cases, the opening of a packed data file by an installation handler application is identified, and classified as the launch of an installer. Installation handler applications can be identified by scanning executable files for associated signatures and/or checking operating system settings identifying applications associated with software installation.

The launch of an uninstaller can be detected by scanning executable files for signatures associated with uninstallers, detecting such a signature in a specific executable file, and identifying the launch of the specific executable. The launch of an uninstaller can also be detected by checking operating system settings identifying executable files associated with uninstalling software, identifying such a specific executable file as an uninstaller responsive to the operating system settings, and detecting the launch of the specific executable file.

A process lineage tree is created representing the detected launched installer or uninstaller process, and all processes launched directly and indirectly thereby. The detected installer or uninstaller process is represented by the root node in the process lineage tree. Launches of child processes by the installer or uninstaller process and by any subsequently launched child processes are detected. The launched child processes are represented by child nodes in the process lineage tree. The terminations of processes represented by nodes in the process lineage tree can be tracked, and the process lineage tree can be updated whenever a process represented by a child node terminates.

Where the launch of an installer is detected, each process represented by a node in the process lineage tree is classified as comprising a component of an installation. Where the launch of an uninstaller is detected, each process represented by a node in the process lineage tree is classified as comprising a component of an uninstallation. The processes represented by nodes in the process lineage tree are exempted from anti-malware analysis. The termination of the installer or uninstaller process represented by the root node in the process lineage tree is detected. When the installer or uninstaller terminates, the processes represented by nodes in the process lineage tree are no longer exempted from anti-malware analysis.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
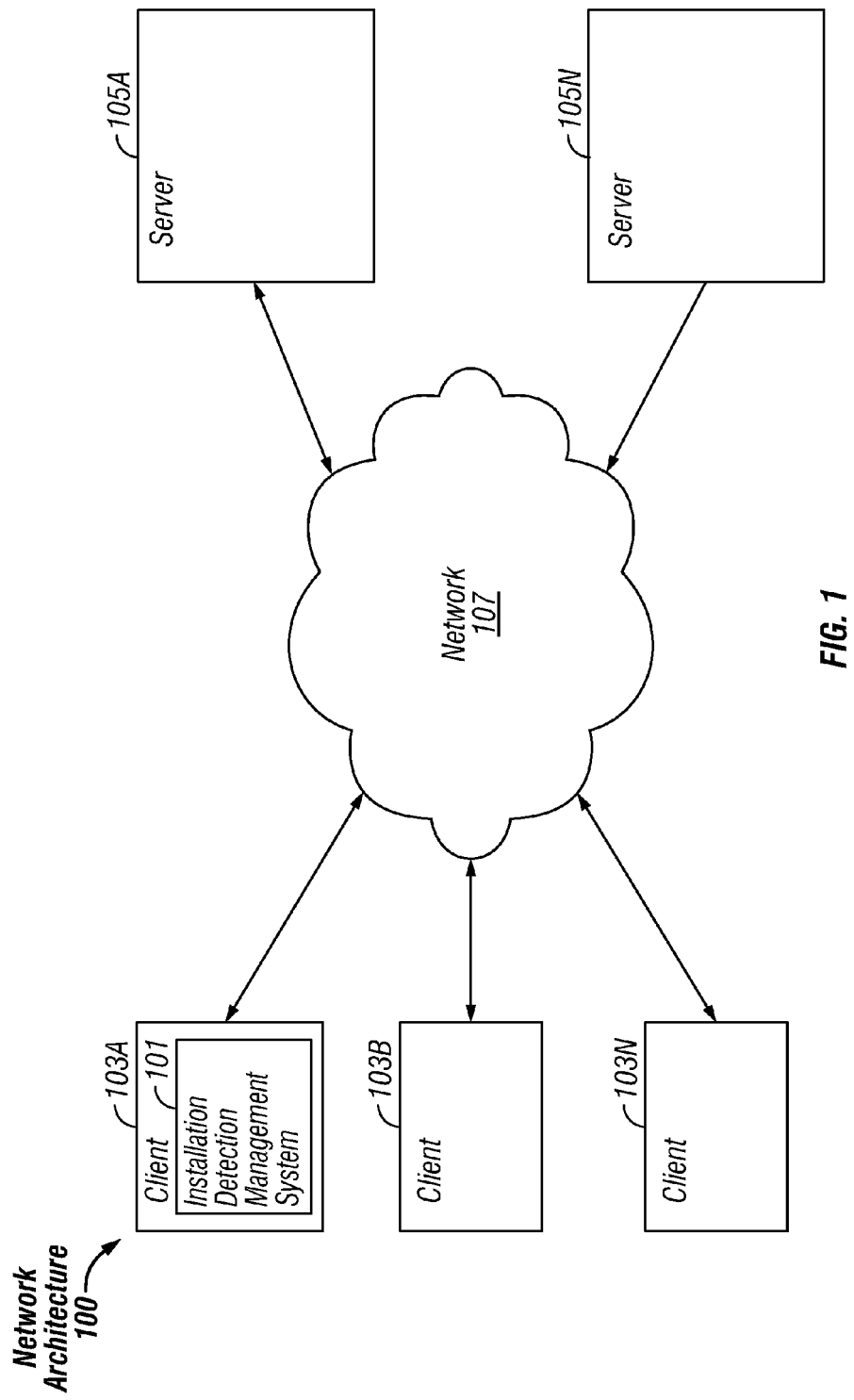
FIG. 1 is a block diagram of an exemplary network architecture in which an installation detection management system can be implemented, according to some embodiments.

FIG. 1 is a block diagram illustrating an exemplary network architecture 100 in which an installation detection management system 101 can be implemented. The illustrated network architecture 100 comprises multiple clients 103A, 103B and 103N, as well as multiple servers 105A and 105N. In FIG. 1, the installation detection management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
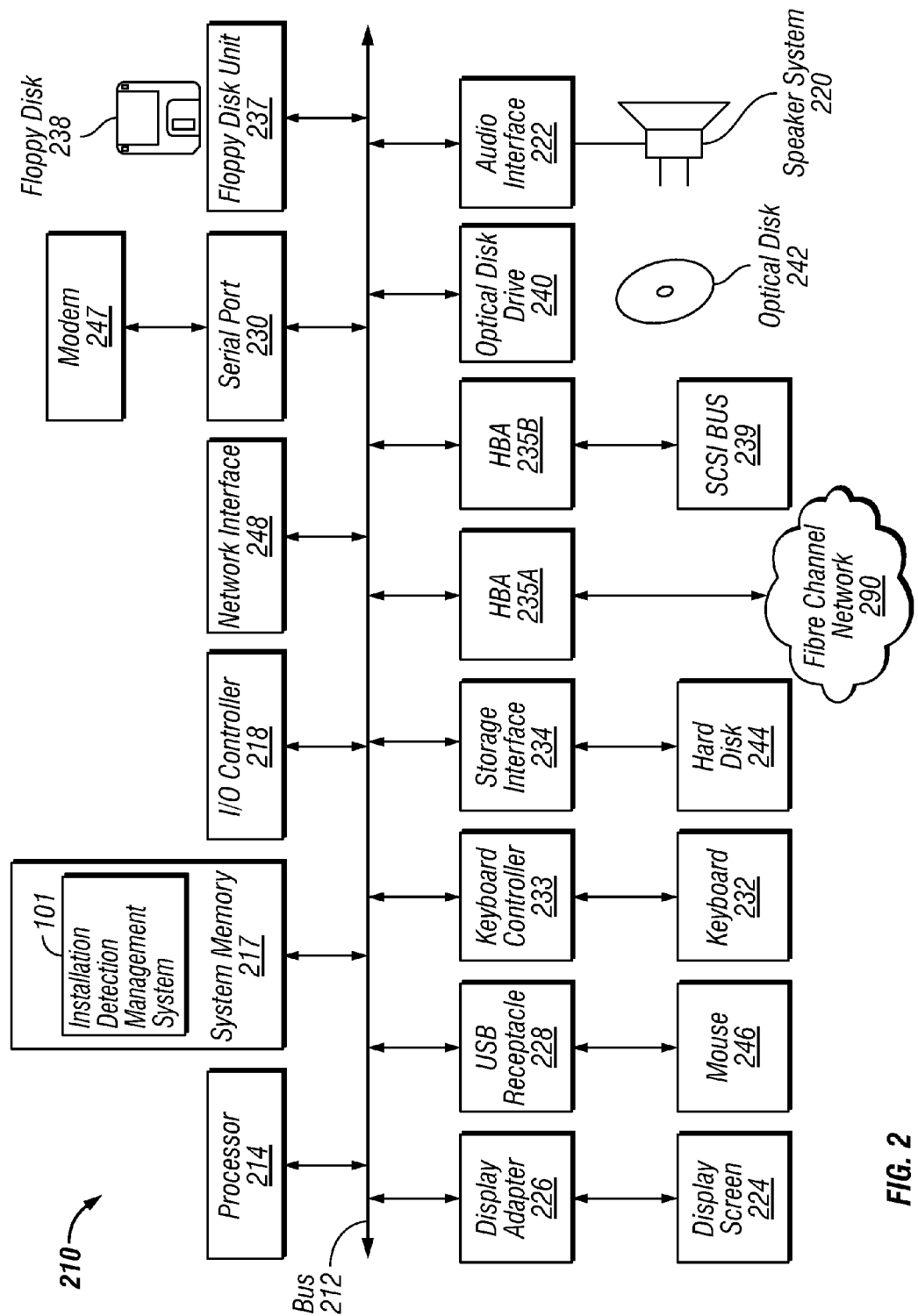
FIG. 2 is a block diagram of a computer system suitable for implementing an installation detection management system, according to some embodiments.

FIG. 2 is a block diagram of a computer system 210 suitable for implementing an installation detection management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the installation detection management system 101 is illustrated as residing in system memory 217. The workings of the installation detection management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
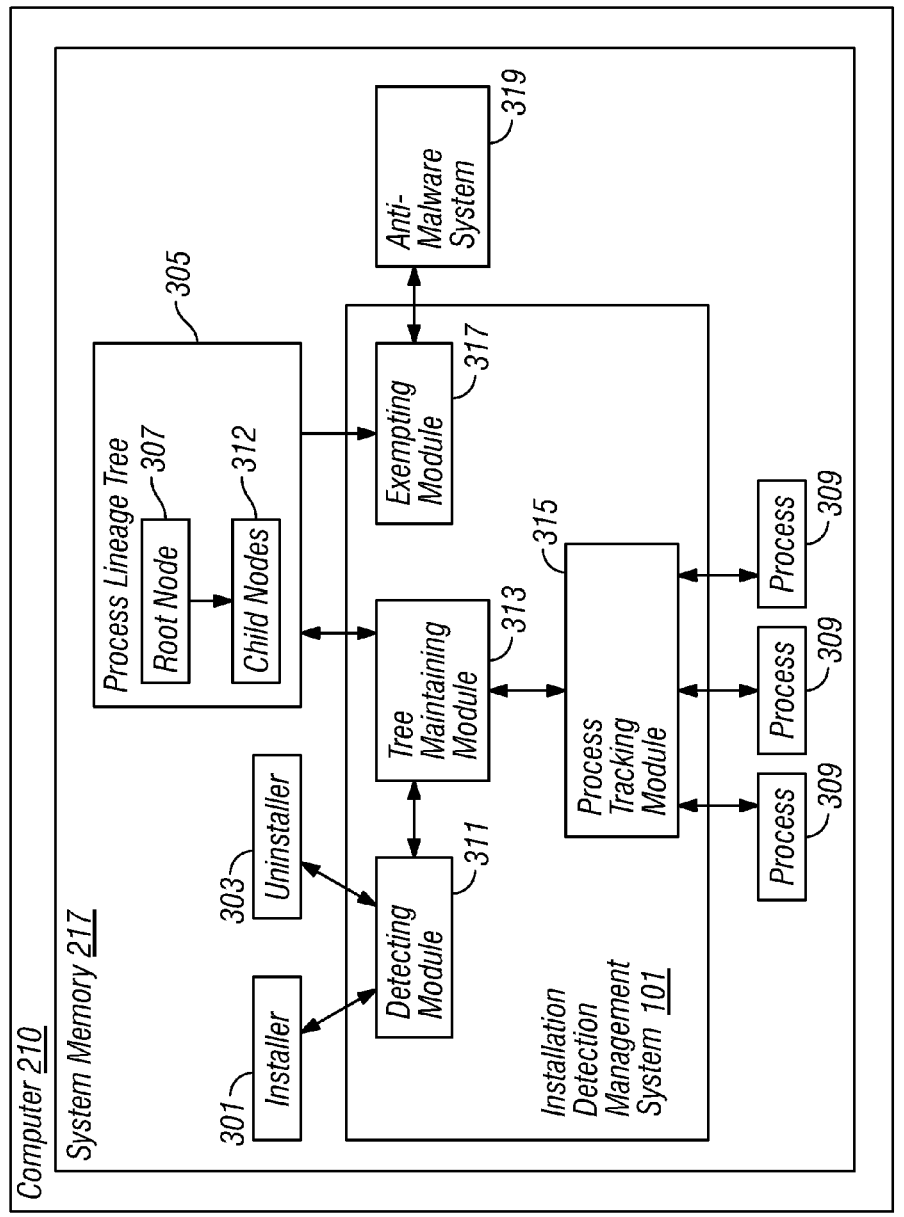
FIG. 3 is a block diagram of the operation of an installation detection management system, according to some embodiments.

FIG. 3 illustrates the operation of an installation detection management system 101 residing in the system memory 217 of a client computer 103, according to some embodiments. As described above, the functionalities of the installation detection management system 101 can reside on a client 103, a server 105, or be distributed between multiple computer systems 210, including within a cloud-based computing environment in which the functionality of the installation detection management system 101 is provided as a service over a network 107. It is to be understood that although the installation detection management system 101 is illustrated in FIG. 3 as a single entity, the illustrated installation detection management system 101 represents a collection of functionalities, which can be instantiated as a single or multiple modules as desired (an instantiation of specific, multiple modules of the installation detection management system 101 is illustrated in FIG. 3). It is to be understood that the modules of the installation detection management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the installation detection management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an installation detection management system 101 detects installation and uninstallation scenarios, by identifying an installer 301 (or uninstaller 303) as it is launched, and creating and tracking a process lineage tree 305 in which the installer 301 (or uninstaller 303) is represented as the root node 307, and each process 309 subsequently launched by the installer 301 or any of its progeny is represented as a child node 312. The installation detection management system 101 maintains and tracks this tree 305 until the process represented by the root node 307 (i.e., the installer 301 or uninstaller 303) terminates. During the time the process represented by the root node 307 is running, all of the processes 309 of the tree 305 are classified as comprising part of the installation (or uninstallation), and are exempted from malware detection analysis, thereby avoiding false positives of malware detection on installation and uninstallation programs, and increasing performance and efficacy.

In order to track the installation (or uninstallation) and exempt it from malware detection analysis, a detecting module 311 of the installation detection management system 101 detects the launch of an installer 301 (detecting uninstallers 303 is discussed separately below). Under different circumstances, the detecting module 311 can do this in different ways. An installer 301 is typically either in the form of an executable file (e.g., a .EXE file) or a packed data file, in a format such as MSI, RAR, CAB, MSP, etc. The format of the installer 301 in question informs how the detecting module 311 detects its launch.

In case of an installer 301 in the form of an executable file, the detecting module 311 first identifies the particular executable file as being an installer 301. To do so, the detecting module 311 scans executable files on the user's computer 210, looking for signatures associated with installers 301. More specifically, executable installers 301 are typically generated by a known installation software package such that a distinctly identifiable signature is included in the executable file comprising the installer 301. For example, executable installers 301 generated by such current, commercial installation software packages as NULLSoft or InstallShield contain specific identifiable signatures that can be identified by scanning as described above. It is to be understood that NULLSoft and InstallShield are simply examples of installation software packages, and other installation software packages also generate identifiable signatures in the executable installers 301 that they generate. Once a given executable file is identified as an installer 301, the detecting module 311 classifies its launch as the launch of an installer 301. It is to be understood that the detecting module 311 can use conventional operating system services to monitor executable files and detect when specific ones are launched.

Where an installer 301 is in the form of a packed data file, typically an associated handler application performs the installation activity, by opening and processing the packed data file. Such handler applications are in the form of executable files. For example, when a user launches a packed data file in the MSI or MSP file format, the Windows program MSIExec.exe opens the packed data file and executes the associated installation processing. With other packed data file formats (and, e.g., under other operating systems) other programs perform this function. To identify the launch of packed data file based installers 301, the detecting module 311 identifies executable files comprising installation handler applications on the user's computer 210, and classifies the opening of a packed data file thereby as the launch of an installer 301. For example, where MSIExec.exe is present on the user's computer 210, the detecting module 311 identifies it, notes when it is launched, notes when it opens a packed data file, and treats the opening of the packed data file as the detection of the launch of an installer 301. The detecting module 311 can identify installation handler applications on the user's computer 210 by scanning executable files and checking for identifying signatures of such applications, and/or by checking operating system settings (e.g., registry settings under Windows) indicating which applications are associated with the installation of software packages. The detecting module 311 can use conventional operating system services to detect the launching of processes and the opening of files thereby. In some embodiments, the detecting module 311 uses signatures or operating system settings to identify packed data files comprising installers 301, as opposed or in addition to identifying installation handler applications. In such embodiments, the detecting module 311 can use conventional operating system services to detect the opening of such packed data files, and classify the opening thereof as the detection of the launch of an installer 301.

Once the detecting module 311 detects the launch of an installer 301, a tree maintaining module 313 of the installation detection management system 101 creates a process lineage tree 305, in which the installer 301 is represented as the root node 307. In the case where the installer 301 is an executable file, that executable file itself is represented as the root node 307. In the case of a packed data file based installer 301, the associated handler application is represented as the root node 307.

A process tracking module 315 of the installation detection management system 101 tracks the launching of all processes 309 by the installer 301, any process 309 launched by the installer 301, and any process 309 launched by such child processes 309, down to any number of generations. Whenever such a process 309 is launched, the tree maintaining module 313 represents it in the process lineage tree 305 as a child node 312 of the node representing the process 309 that launched it. In other words, the process lineage tree 305 represents the installer 301 and all of its progeny processes 309, nested to any number of levels. The process tracking module 315 also tracks the termination of processes 309 represented by nodes 312 in the process lineage tree 305. When a process 309 represented by a child node 312 terminates, the tree maintaining module 313 updates the process lineage tree 305 accordingly. It is to be understood that the process tracking module 315 can use conventional operating system services to track the launching and terminating of processes 309.

Figure 4:
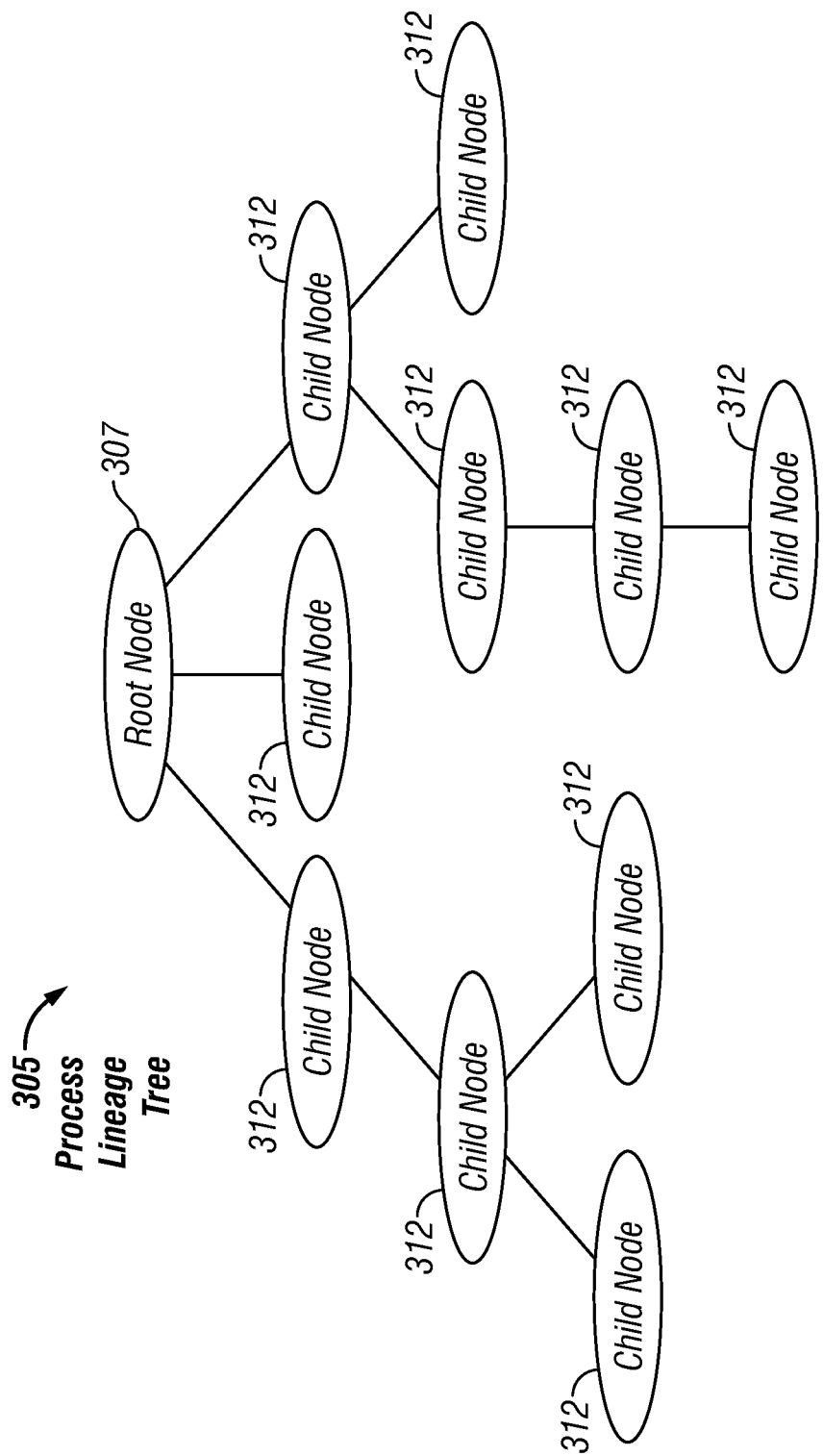
FIG. 4 is a graph of a process lineage tree, according to some embodiments.

Thus, the installer 301 and all processes 309 it launches directly and indirectly are tracked in the process lineage tree 305. In addition to the installer 301, every process 309 represented by a child node 312 in the process lineage tree 305 is considered to be part of the installation. An example process lineage tree 305 is illustrated in FIG. 4. It is to be understood that the process lineage tree 305 can be instantiated in the form of any data structure in computer memory 217, used to represent a hierarchical relationship between a group of processes 309, originating with the installer 301 and including all processes 309 launched by the installer 301 or its progeny.

An exempting module 317 of the installation detection management system 101 communicates with any anti-malware system 319 (local, as illustrated, or remote) which subjects the user's computer 210 to anti-malware analysis (e.g., anti-virus software). The exempting module 317 directs the anti-malware system 319 to exempt the installer 301 and every other process 309 represented in the process lineage tree 305 from anti-malware analysis. Because the processes 309 represented by the process lineage tree 305 are known to be the installer 301 itself (represented by the root node 307), and processes 309 launched (directly or indirectly) thereby (represented by child nodes 312), as explained above these processes 309 are all considered to be part of the installation, and can thus be exempted from anti-malware analysis. Thus, any activity performed by any of these processes 309 that would otherwise appear suspicious and trigger analysis, blocking or other processing by the anti-malware system 319 can safely be ignored. As long as the activity in question is performed by a process 309 represented in the process lineage tree 305, it is known that the activity is part of the installation and thus legitimate. Thus, false positives of malware detection on installation programs are avoided.

The tree maintaining module 313 maintains the process lineage tree 305, and the process tracking module 315 tracks the processes 309 represented thereby until the installer 301 (represented by the root node 307) terminates. The termination of the installer 301 is detected by the detecting module 311. Where the installer 301 comprises an executable, the detecting module 311 can use conventional operating system services to detect when the executable exits. When the installer 301 is in the form of a packed data file, the detecting module 311 can use conventional operating system services to detect when the installation handler application closes the packed data file, which is considered to constitute the termination of the installer 301. In any case, when the installer 301 terminates, the tree maintaining module 313 deletes the process lineage tree 305. When the process lineage tree 305 is deleted, the process tracking module 315 stops tracking any processes 309 that were formerly represented by child nodes 312 on the tree 305 that might be still running, and the exempting module 317 stops exempting these processes 309 from anti-malware analysis. Thus, any activity executed by any such processes 309 that are still running after the installer 301 terminates are now subject to the same anti-malware analysis as any other program on the user's computer 210, since they are no longer acting on behalf of the installer 301. This subjects any new activity on the computer 210 to anti-malware analysis where an installer 301 launches a process 309 (e.g., a browser to display information) as a last step before exiting. It is desirable that the, e.g., browser, and any processes subsequently launched thereby be analyzed by the anti-malware system 319 for maliciousness, as this is no longer part of the installation.

The above description concerns an installation scenario, but it is to be understood that the same functionality can be utilized in the case of an uninstallation scenario. In that case, rather than detecting the launch and termination of an installer 301, the detecting module 311 detects the launch and termination of an uninstaller 303. The rest of the above-described functionality is the same (e.g., creating, maintaining and purging the tree 305, exempting processes 309 represented in the tree 305 from anti-malware analysis, etc.). The detecting module 311 can detect the launch of an uninstaller 303 in one of several ways. Often, an uninstaller 303 is in the form of an executable file associated with a known installation package. Such uninstallers 303 can be detected by scanning executable files for a known identifying signature, as described above in conjunction with signature based identification of installers 301. In other cases, the detecting module 311 reads operating system settings (e.g., the registry under Windows) to glean the identity of uninstallers 303. For each application installed on a computer 210, there is typically an entry in the operating system settings indicating what executable file to launch to remove it. By reading the operating system settings, the detecting module 311 can identify uninstallers 303 on the user's computer. Either way, the detecting module 311 can use conventional operating system services to detect the launch and exit of identified uninstallers 303.

As described above, installers 301, uninstallers 303 and the processes 309 launched thereby are exempted from anti-malware analysis. In some embodiments, where specific malware is identified as being associated with a specific installer 301 or uninstaller 303, that installer 301 (or uninstaller 303) can be identified by signature, and subject to anti-malware analysis. In other words, the installation detection management system 101 can by default exempt installation and uninstallation scenarios from anti-malware analysis as described above, and yet retain such anti-malware analysis for specific installers 301 and/or uninstallers 303 as desired.

Figure 5:
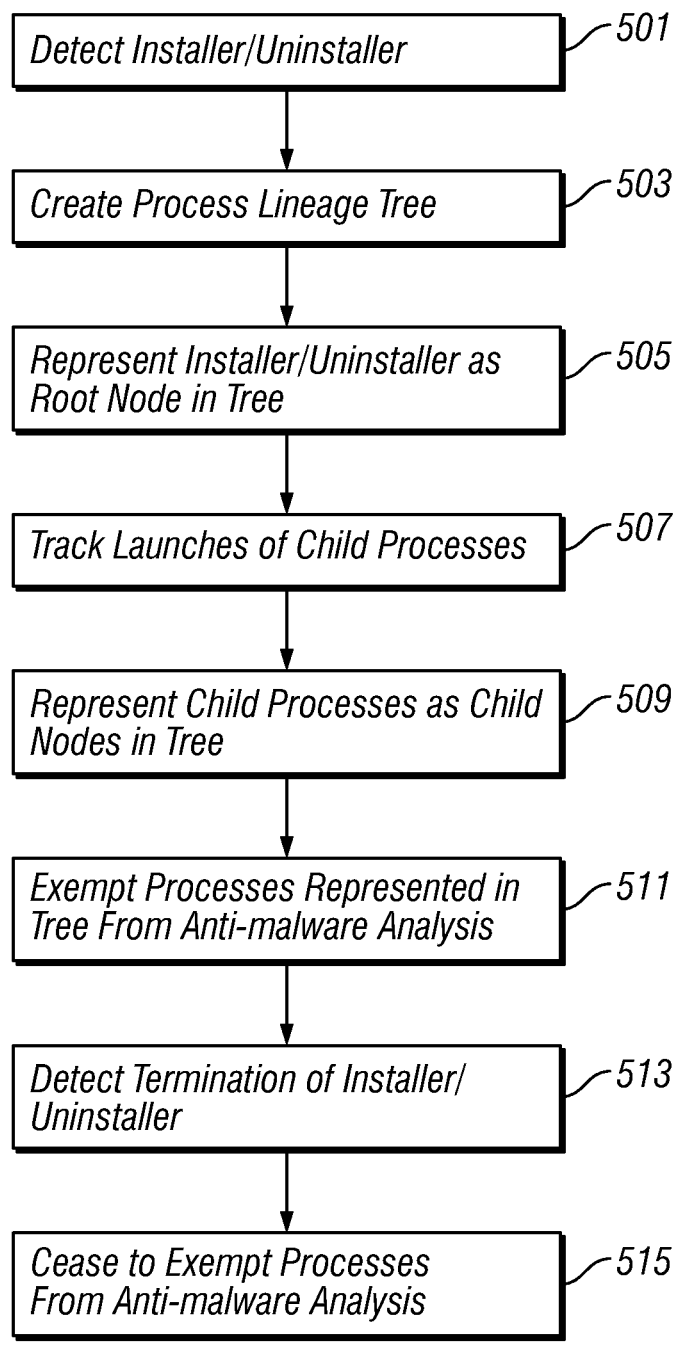
FIG. 5 is a flowchart of the operation of an installation detection management system, according to some embodiments.

FIG. 5 illustrates steps of the operation of an installation detection management system 101 (FIG. 1), according to some embodiments. The detecting module 311 (FIG. 3) detects 501 the launch of an installer 301 (FIG. 3) or an uninstaller 303 (FIG. 3). The tree maintaining module 313 (FIG. 3) creates 503 a process lineage tree 305 (FIG. 3) representing the detected launched installer/uninstaller process 301/303 (FIG. 3) and all processes 309 (FIG. 3) launched directly and indirectly thereby. The tree maintaining module 313 (FIG. 3) represents 505 the detected launched installer/uninstaller process 301/303 (FIG. 3) by the root node 307 (FIG. 3) in the process lineage tree 305 (FIG. 3). The process tracking module 315 (FIG. 3) tracks 507 the launches of child processes 309 (FIG. 3) by the detected launched installer/uninstaller process 301/303 (FIG. 3) and by any subsequently launched child processes 309 (FIG. 3). The tree maintaining module 313 (FIG. 3) represents 509 launched child processes 309 (FIG. 3) by child nodes 312 (FIG. 3) in the process lineage tree 305 (FIG. 3). The exempting module 317 (FIG. 3) exempts 511 the processes 301/302/309 (FIG. 3) represented by nodes 307/312 (FIG. 3) in the process lineage tree 305 (FIG. 3) from anti-malware analysis. The detecting module 311 (FIG. 3) detects 513 the termination of the process 301/302 (FIG. 3) represented by the root node 307 (FIG. 3) in the process lineage tree 305 (FIG. 3). The exempting module 317 (FIG. 3) ceases 515 to exempt the processes 301/302/309 (FIG. 3) represented by nodes 307/312 (FIG. 3) in the process lineage tree 305 (FIG. 3) from anti-malware analysis, responsive to detecting termination of the process 301/302 (FIG. 3) represented by the root node 307 (FIG. 3) in the process lineage tree 305 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for identifying installation and uninstallation scenarios, and exempting processes associated therewith from anti-malware analysis, the method comprising the steps of:

detecting, by a computer, a launch of a process from an application from a group of applications consisting of: an installer and an uninstaller;

creating, by a computer, a process lineage tree representing the detected launched process and all processes launched directly and indirectly thereby;

representing, by a computer, the detected launched process by a root node in the process lineage tree;

tracking, by a computer, launches of child processes by the detected launched process and by any subsequently launched child processes, said subsequently launched child processes comprising child processes launched by the detected launched process and child processes launched by any subsequently launched child process;

representing, by a computer, subsequently launched child processes by child nodes in the process lineage tree; and exempting, by a computer, the processes represented by nodes in the process lineage tree from anti-malware analysis.

2. The method of claim 1 further comprising:

detecting, by a computer, a launch of a process comprising an installer; and classifying, by a computer, each process represented by a node in the process lineage tree as comprising a component of an installation.

3. The method of claim 1 further comprising:

detecting, by a computer, a launch of a process comprising an uninstaller; and classifying, by a computer, each process represented by a node in the process lineage tree as comprising a component of an uninstallation.

4. The method of claim 1 wherein detecting, by a computer, a launch of a process from an application from a group of applications consisting of: an installer and an uninstaller further comprises:

scanning, by a computer, executable files for at least one signature associated with an installer;

detecting, by a computer, a signature associated with an installer in a specific executable file;

identifying, by a computer, the specific executable file as an installer responsive to detecting the signature;

detecting, by a computer, a launch of the specific executable file; and classifying, by a computer, the launch of the specific executable file as the launch of a process comprising an installer.

5. The method of claim 1 wherein detecting, by a computer, a launch of a process from an application from a group of applications consisting of: an installer and an uninstaller further comprises:

identifying, by a computer, an installation handler application;

detecting, by a computer, an opening of a packed data file by the installation handler application; and classifying, by a computer, the opening of the packed data file by the installation handler application as the launch of a process comprising an installer.

6. The method of claim 5 wherein identifying, by a computer, an installation handler application further comprises:

scanning, by a computer, executable files for at least one signature associated with an installation handler application;

detecting, by a computer, a signature associated with an installation handler application in a specific executable file; and identifying, by a computer, the specific executable file as an installation handler application responsive to detecting the signature.

7. The method of claim 5 wherein identifying, by a computer, an installation handler application further comprises:

checking, by a computer, operating system settings identifying the installation handler application as an application associated with installing software.

8. The method of claim 1 wherein detecting, by a computer, a launch of a process from an application from a group of applications consisting of: an installer and an uninstaller further comprises:

identifying, by a computer, a packed data file;

detecting, by a computer, an opening of the packed data file by an installation handler application; and classifying, by a computer, the opening of the packed data file by the installation handler application as the launch of a process comprising an installer.

9. The method of claim 1 wherein detecting, by a computer, a launch of a process from an application from a group of applications consisting of: an installer and an uninstaller further comprises:

scanning, by a computer, executable files for at least one signature associated with an uninstaller;

detecting, by a computer, a signature associated with an uninstaller in a specific executable file;

identifying, by a computer, the specific executable file as an uninstaller responsive to detecting the signature;

detecting, by a computer, a launch of the specific executable file; and classifying, by a computer, the launch of the specific executable file as the launch of a process comprising an uninstaller.

10. The method of claim 1 wherein detecting, by a computer, a launch of a process from an application from a group of applications consisting of: an installer and an uninstaller further comprises:

checking, by a computer, operating system settings identifying executable files associated with uninstalling software;

identifying, by a computer, a specific executable file as an uninstaller responsive to the operating system settings;

detecting, by a computer, a launch of the specific executable file; and classifying, by a computer, the launch of the specific executable file as the launch of a process comprising an uninstaller.

11. The method of claim 1 further comprising:

tracking, by a computer, terminations of processes represented by nodes in the process lineage tree; and updating, by a computer, the process lineage tree, responsive to detecting a termination of a process represented by a child node in the process lineage tree.

12. The method of claim 1 further comprising:

detecting, by a computer, termination of the process represented by the root node in the process lineage tree; and ceasing to exempt, by a computer, the processes represented by nodes in the process lineage tree from anti-malware analysis, responsive to detecting termination of the process represented by the root node in the process lineage tree.

13. At least one computer readable storage medium storing a computer program product for identifying installation and uninstallation scenarios, and exempting processes associated therewith from anti-malware analysis, the computer program product comprising:

program code for detecting a launch of a process from an application from a group of applications consisting of: an installer and an uninstaller;

program code for creating a process lineage tree representing the detected launched process and all processes launched directly and indirectly thereby;

program code for representing the detected launched process by a root node in the process lineage tree;

program code for tracking launches of child processes by the detected launched process and by any subsequently launched child processes, said subsequently launched child processes comprising child processes launched by the detected launched process and child processes launched by any subsequently launched child process;

program code for representing subsequently launched child processes by child nodes in the process lineage tree; and program code for exempting the processes represented by nodes in the process lineage tree from anti-malware analysis.

14. The computer program product of claim 13 further comprising:

program code for detecting a launch of a process comprising an installer, and classifying each process represented by a node in the process lineage tree as comprising a component of an installation; and program code for detecting a launch of a process comprising an uninstaller, and classifying each process represented by a node in the process lineage tree as comprising a component of an uninstallation.

15. The computer program product of claim 13 wherein the program code for detecting a launch of a process from an application from a group of applications consisting of: an installer and an uninstaller further comprises:

program code for scanning executable files for at least one signature associated with an installer;

program code for detecting a signature associated with an installer in a specific executable file;

program code for identifying the specific executable file as an installer responsive to detecting the signature;

program code for detecting a launch of the specific executable file; and program code for classifying the launch of the specific executable file as the launch of a process comprising an installer.

16. The computer program product of claim 13 wherein the program code for detecting a launch of a process from an application from a group of applications consisting of: an installer and an uninstaller further comprises:

program code for identifying an installation handler application;

program code for detecting an opening of a packed data file by the installation handler application; and program code for classifying the opening of the packed data file by the installation handler application as the launch of a process comprising an installer.

17. The computer program product of claim 13 wherein the program code for detecting a launch of a process from an application from a group of applications consisting of: an installer and an uninstaller further comprises:

program code for identifying a packed data file;

program code for detecting an opening of the packed data file by an installation handler application; and program code for classifying the opening of the packed data file by the installation handler application as the launch of a process comprising an installer.

18. The computer program product of claim 13 wherein the program code for detecting a launch of a process from an application from a group of applications consisting of: an installer and an uninstaller further comprises:

program code for identifying a specific executable file as an uninstaller;

program code for detecting a launch of the specific executable file; and program code for classifying the launch of the specific executable file as the launch of a process comprising an uninstaller.

19. The computer program product of claim 13 further comprising:

program code for detecting termination of the process represented by the root node in the process lineage tree; and program code for ceasing to exempt the processes represented by nodes in the process lineage tree from anti-malware analysis, responsive to detecting termination of the process represented by the root node in the process lineage tree.

20. A computer system for identifying installation and uninstallation scenarios, and exempting processes associated therewith from anti-malware analysis, the computer system comprising:

a processor;

computer memory;

means for detecting a launch of a process from an application from a group of applications consisting of: an installer and an uninstaller;

means for creating a process lineage tree representing the detected launched process and all processes launched directly and indirectly thereby;

means for representing the detected launched process by a root node in the process lineage tree;

means for tracking launches of child processes by the detected launched process and by any subsequently launched child processes, said subsequently launched child processes comprising child processes launched by the detected launched process and child processes launched by any subsequently launched child process;

means for representing subsequently launched child processes by child nodes in the process lineage tree; and means for exempting the processes represented by nodes in the process lineage tree from anti-malware analysis.

* * * * *